United States Patent [19]

Walker et al.

[11] Patent Number: 5,014,846
[45] Date of Patent: May 14, 1991

[54] PROTECTIVE COVER FOR EYEGLASSES

[76] Inventors: Scott A. Walker, P.O. Box 651, Helendale, Calif. 92342; Randy J. Walker, P.O. Box 1056, Inyokern, Calif. 93527

[21] Appl. No.: 579,571
[22] Filed: Sep. 10, 1990
[51] Int. Cl.⁵ .............................................. A45C 11/04
[52] U.S. Cl. ...................................... 206/5; 351/156; 150/154
[58] Field of Search .................. 206/5, 6; 150/154; 224/202, 205, 253; 351/155, 156, 157

[56] References Cited

U.S. PATENT DOCUMENTS

| | | | |
|---|---|---|---|
| 2,499,332 | 2/1950 | Schiff | 206/5 |
| 2,557,552 | 6/1951 | Martin | 206/5 |
| 2,704,961 | 3/1955 | Weil | 351/157 |
| 2,858,733 | 11/1958 | Lodewick et al. | 351/157 |
| 3,050,181 | 8/1962 | Nathan | 206/5 |
| 4,541,696 | 9/1985 | Winger et al. | 351/156 X |
| 4,606,453 | 8/1986 | Burns | 206/5 |
| 4,863,013 | 9/1989 | Eastman | 206/5 |
| 4,953,695 | 9/1990 | Tallman | 206/5 |

Primary Examiner—Jimmy G. Foster
Assistant Examiner—Jacob K. Ackun, Jr.
Attorney, Agent, or Firm—James Bartholomew

[57] ABSTRACT

A protective cover for eyeglasses is comprised of flexible material that can be folded into a compact configuration suitable for storage within a pouch. The pouch is either integrally formed within a strap for retaining eyeglasses about one's neck or is provided with rings for attachment to the strap or portions of an eyeglass frame. The flexible material comprising a cover body of the invention is tethered by a cord to the inside of the pouch so that it cannot be lost. The flexible cover body is stretchable to envelope the lens portion of eyeglasses and includes a hem around an opening in the cover body through which eyeglasses are inserted for protection therein. This hem includes an elastic band which tends to draw the cover body snugly about the eyeglass lenses.

16 Claims, 2 Drawing Sheets

PROTECTIVE COVER FOR EYEGLASSES

BACKGROUND OF THE INVENTION

This invention relates generally to an improved protective cover for eyeglasses. More particularly, this invention relates to a protective eyeglass cover that is removable storable inside a pouch provided within a strap for hanging eyeglasses about one's neck.

Spectacle receptacles and eyeglass cases are well known. Such protective holders for eyeglasses are necessary because spectacles are vulnerable to being scratched or damaged when left unprotected. Currently available eyeglass protective covers and cases suffer from vairous deficiencies which tend to deter an eyeglass owner from using these prior cases or covers to protect glasses when not in use. Foremost amongst the drawbacks of prior protective eyeglass receptacles is their large and bulky size. Often, prior eyeglass cases are rigid, thereby ensuring that the case is incapable of assuming a compact storage profile. As a result, prior large, bulky and/or rigid conventional eyeglass cases usually must be stored in a user's pocket when not in use or during transport of eyeglasses. Typically, a bulky, rigid conventional eyeglass case will fit awkwardly in a pocket and often will protrude therefrom. This results in an arrangement which may lack the comfort or style sought by an eyeglass owner. Thus, in order to avoid an awkward or unstylish scenario wherein an eyeglass case fits within a pocket in an undesirable manner (e.g. pocket may be inappropriately sized to accommodate the case), the eyeglass wearer will commonly forego use of the case. Unfortunately, this leaves eyeglasses unprotected when not in use. A similar situation results when the eyeglass case is lost or misplaced, which frequently happens since, conventionally, no means are provided to keep the eyeglasses and case from becoming separated. In the absence of an appropriate case, spectacles are often placed unprotected in a shirt or blouse pocket for easy access and thus can fall easily out onto the floor or ground when the wearer bends or stoops.

A special instance wherein eyeglass protection problems arise occurs with sunglasses at a beach. Today's sunglasses are often expensive and are certainly worth protecting. The multitude of sand particles at the beach definitely present a hazard easily capable of scratching the lenses of the sunglasses if said sunglasses are left unprotected and exposed to sand that is typically blown and kicked about along the shore. Conventional eyeglasses protective cases, usually stored in one's pocket, are inappropriate for beach use because swimwear typically has no pockets. Thus, the problem of retaining a protective eyeglasses cover on one's body, without using pockets, must be addressed so that beach goers may gave sunglasses protection that is readily available and difficult to lose.

Yet, another drawback of prior conventional eyeglass cases is that typically such cases cannot be washed (especially by machine) or readily cleaned, and therefore foreign matter can become trapped within the case. As a result, when spectacles are inserted within the case, the foreign matter accumulated therein will scratch the lenses.

Thus, there exists a need for an improved protective cover for eyeglasses which is easily cleaned and which can be machine washed. Moreover, a need exists for an eyeglass cover which can be kept on one's body without requiring the presence of a pocket in the apparel of an eyeglass owner. Finally, an improved eyeglass protective cover is needed which can assume a compact storage profile and which is lightweight and flexible. The present invention fulfills these needs in a relatively inexpensive fashion and provides further related advantage.

BRIEF DESCRIPTION OF THE DRAWINGS

The accompanying drawings illustrate the invention. In such drawings.

DETAILED DESCRIPTION OF THE PREFERRED EMBODIMET

Figure 1:
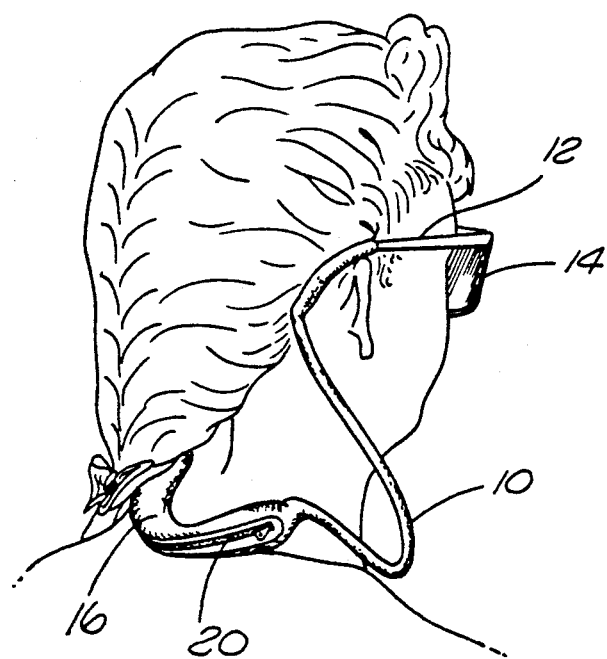
FIG. 1 is a perspective view of an improved protective eyeglass cover embodying the invention and showing a strap that retains the eyeglasses about one's neck while also providing a pouch that houses a protective cover body.

As shown in the drawing for purposes of illustration, the present invention resides in an improved protective cover for spectacles. The spectacle protector of the present invention comprises a flexible body of stretchable material that is conformable about the lenses of eyeglasses and that is tethered to a strap for hanging eyeglasses about one's neck. The strap provides a pouch for storage of the flexible cover body therein when not in use. The provision of a pouch integrally formed within said strap, as well as the afore-mentioned tethered arrangement, advantageously allows the flexible cover body to be retained on one's person (by storage within the strap while said strap is attached to arms of a pair of eyeglasses) without requiring the use of pockets or a purse, and beneficially ensures that the cover body will not become lost since it is inseparably joined to the strap by a tether.

The present invention is particularly useful for protecting sunglasses from the abrasive sandy environment of a beach because typically beach-goers wear swimwear that provide no pockets for storage of an eyeglass case or the like. This is not hindrance with the improved eyeglass cover of this invention because the cover is storable within a pouch provided by a strap for retaining glasses about one's neck. Thus, the present invention can always be readily available to protect glasses not in use because transport of this invention requires only that one attach the strap to the arms of spectacles, and does not require pockets, purses or other conventional means for storing an item during transport. As long as one is utilizing eyeglasses with the strap of the present invention attached thereto (thereby providing a desirable arrangement allowing one to hang the glasses about one's neck), the cover body stored inside pouch of said strap will be readily available for protective purposes.

Anyone who has ever misplaced or lost an eyeglass case, lens cover, or the like will acclaim the feature of the present invention whereby the flexible cover body that fits over lenses is tethered to an interior portion of said pouch, thereby making it extremely difficult to lose said cover body as long as the pouch-providing strap remains attached to the arms of the eyeglasses. Yet, another major advantage of the present invention is that the cover body and strap are both machine washable. This allows periodic cleaning of the eyeglass cover so that dirt will not accumulate thereon and scratch the lenses. In short, the expensiveness of modern eyeglasses and sunglasses demands an improved protective arrangement to prolong the life of spectacles and present invention provides this in a relatively inexpensive fashion.

In accordance with the present invention and with reference to FIG. 1, a strap 10 is provided having first and second ends, each of which is adapted with means for releasably attaching the strap to an arm 12 of a pair of eyeglasses 14. to achieve this, the strap 10 is preferably comprised of a fabric material having a substantially tubular configuration at least at the end of the strap 10 to fit snugly about a distal portion of an eyeglass arm 12. Thus, in a preferred form, the eyeglass arms 12 fit within tubular ends of the strap 10; however, other means for releasably attaching the strap ends to spectacles, such as clips or 2 rings each of which encircles an arm 12, are regarded as being within the scope of the present invention.

The strap 10 includes an enlarged portion proximate its midsection. This enlarged portion comprised a pouch 16 that is internally formed within the material comprising the strap 10. That is, the pouch 16 is defined within the strap 10. the strap material which defines the pouch 16 further defines a mouth 18 (see FIG. 2) that provides access to an internal cavity defined within said pouch. Closure means such as a zipper 20 are provided on the strap 10 to allow one to fasten shut the pouch 16 contained therein. Alternative closure means such as hook and loop fasteners, (such as those sold under trademark "VELCRO,") snaps, buttons, fold-over flaps, etc. are also usable with the present invention.

Figure 2:
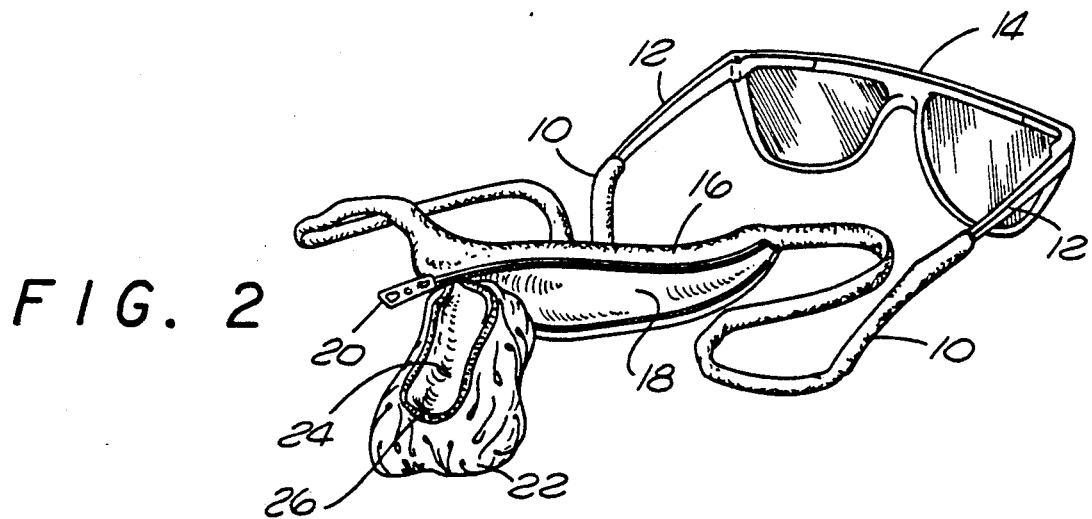
FIG. 2 is a perspective view showing the pouch in an unzipped state to allow removal of the cover body therefrom.
Figure 7:
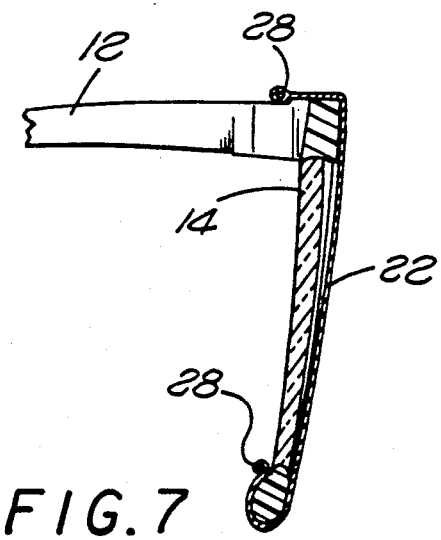
FIG. 7 is an enlarged cross-sectional view taken generally on line 7-7 of FIGS. 3 and 6, illustrating the manner in which the cover body envelopes the eyeglass lens portion, with the frame of the eyeglass being shown in fragment.

When the pouch 16 is open, as in FIG. 2, a flexible protective eyeglass cover body 22 is accessible and can be manually withdrawn from storage within said pouch. The cover body 22 comprises a hollow body formed of flexible material which is generally configured and is stretchably conformable to correspond with the shape of the eyeglasses that is is to surround and protect. The cover body 22 is provided with edges that define an enlarged opening 24 having a size sufficient to pass eyeglasses therethrough and also includes means for securing said edges about the eyeglasses. Although alternative closure means, such as those mentioned previously, are suitable for affixing the cover body 22 about the eyeglasses 14 in the manner shown in FIG. 3, the preferred arrangement is to provide a hem 26 along the edges defining the cover opening 24. An elastic ban 28 (visible only in FIG. 7) is located in the hem 26 and the elastic memory of the elastic band 28 automatically will draw the edges of the cover body 22 tightly about the lenses of the eyeglasses 14. Alternatively, a drawstring having a pullable, exposed portion may be utilized within the hem 26 instead of the elastic band 28.

Figure 3:
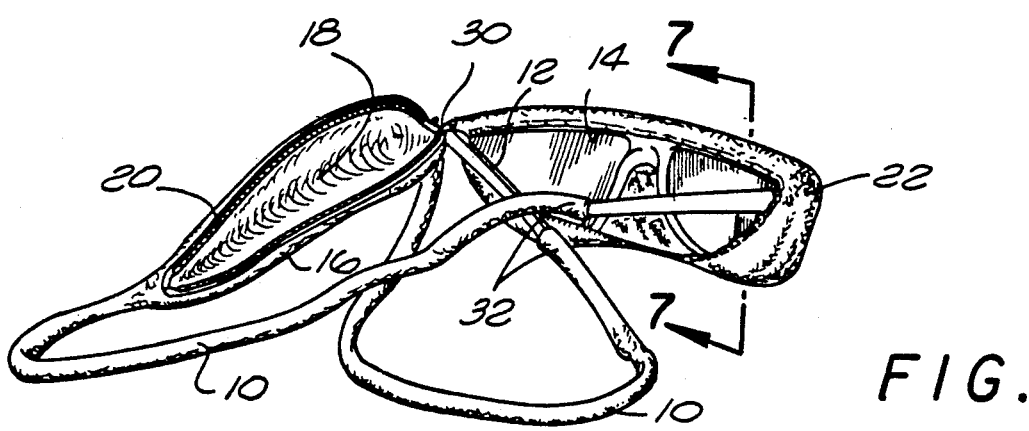
FIG. 3 is a perspective view illustrating a cover body that has been completely removed from its storage pouch and that has been placed over the eyeglasses for protection thereof.

FIGS. 1-3 show the three steps of using the invention to protect and to cover a pair of eyeglasses. In step 1, (FIG. 1), the eyeglass cover body 22 is stored within the pouch 16 and the strap 10 provides a safety means for retaining the eyeglasses 14 about the wearer's neck if the arms 12 should slip off of the wearer's ears (a likely scenario should the wearer bend over). To facilitate the storage phase of step 1, the cover body 22 is foldable upon itself to a compact storage profile which readily fits within the pouch 16.

In step 2, (FIG. 2), the zipper 20 (or alternate closure means) is open to gain access to the interior of the pouch 16, and the cover body 22 is withdrawn from the pouch through the mouth 18 of said pouch. In order to ensure that the cover body 22 will not become lost or misplaced during or after withdrawal of said cover body from the pouch 16, a tether cord 30 (see FIGS. 3 and 6) is provided to maintain a connection between the cover body 22 and the strap 10. The tether cord 30 has a first end attached to the cover body 22 and has a second end attached to an interior portion of the pouch 16. Such attachments can be made by conventional sewing. The tether cord 30 is preferably comprised of an elastic band, although non-elastic cords are also contemplated as being a useful variation within the scope of this invention.

FIG. 3 shows the step of using the cover body 22 to encompass and protect the lens portion of the eyeglasses 14. The manner in which the cover body 22 fits around the lenses and is retained thereabout by the elastic band 28 is best depicted in cross-sectional view of FIG. 7. Note that the ends of the strap 10 may remain attached to the arms 12 of the eyeglasses 14, while the cover body 22 is encompassing the eyeglass lenses. In order to facilitate insertion of the distal ends of the arms 12 within the tubular shaped ends of the strap 10, a stiffener, such as surgical tubing or a short rigid tenth of tubing, may be provided at strap end locations designated by reference numeral 32 in FIG. 3. The presence of such stiffening elements will better maintain a tubular configuration of the flexible material comprising the strap 10. In order to facilitate accommodation of a wide variety of types and sized of eyeglasses within the cover body 22, said body must be comprised of an elastic or stretchable material that can be stretched to an expanded size during insertion of a pair of eyeglasses into the cover body.

Preferably, the strap 10, the pouch 16, and the cover body 22 are all comprised of a knitted or woven material. Among fabrics most suitable for use as these elements are cotton, flannel, and soft knit fabrics. One goal in the selection of a material suitable for the cover body 22 is to choose a smooth, soft material (e.g. flannel or felt) which will not scratch the lenses of the spectacles. This is because, in use, the cover body 22 is configured to closely conform to the exterior surface of the eyeglass lenses such that contact therebetween is unavoidable. Another aim in properly selecting a material suitable for the cover body 22 is to choose a material which allows expansion to accept the spectacles and which automatically contracts thereafter to conformally engage the spectacles inserted within said cover body. This conformal engagement is such that the primary height and depth dimensions of a pair of eyeglasses stored within said cover body 22 will be increased by no more than the thickness of the material comprising the cove body 22 because said body will closely adhere to said eyeglasses.

With further regard to the materials of construction of the present invention, knitted materials or synthetic materials such as soft wool or polyester type materials, including blends thereof are acceptable. The strap, pouch and cover body can be produced from yarns, threads and filaments of natural or synthetic fibers as well as knitting, weaving and crocheting. The broad variety of currently available materials when used in combination with any of a number of production processes, will allow the present invention to be constructed with a broad range of different attributes such as elasticity, design, color, decoration, monograms, and initials.

Figure 4:
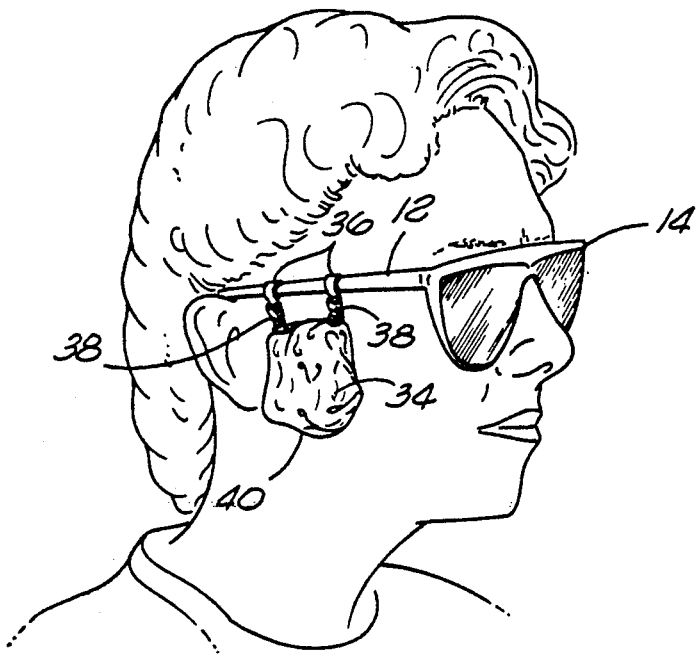
FIG. 4 is a perspective view showing another embodiment of the pouch having rings that attach to the frame of eyeglasses, with said protective cover body being stored within said pouch.
Figure 5:
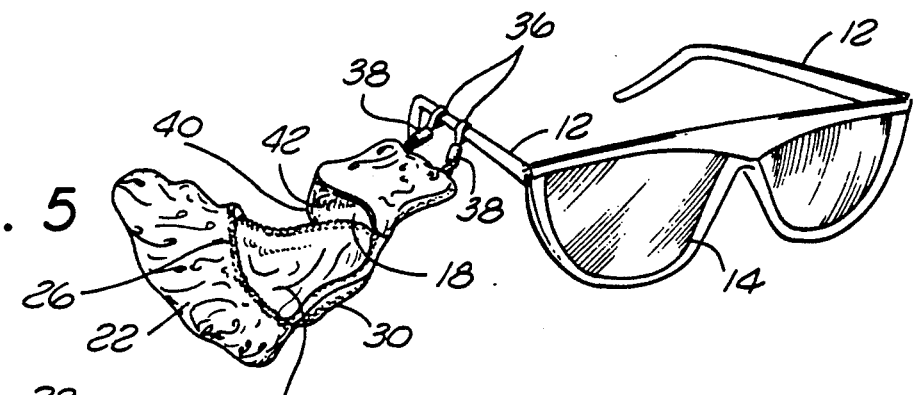
FIG. 5 is a perspective view depicting the pouch in an opened state to allow removal of the cover body therefrom.
Figure 6:
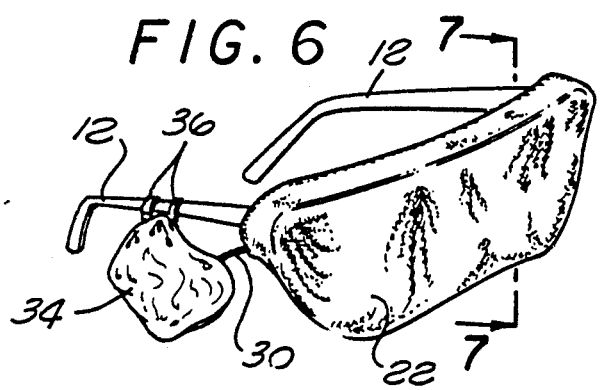
FIG. 6 is a perspective view showing the cover body completely removed from its storage pouch and placed over the eyeglasses for protection thereof.

FIGS. 4, 5, and 6 illustrate the present invention having an alternative pouch embodiment. Identical elements of FIGS. 1–3 and FIGS. 4–6 have been designated with the same reference numerals for easy identification. In this alternative embodiment of the invention, the cover body 22 is retained within a pouch 34 that is not integrally formed within a strap for eyeglasses, but which is capable of being associated with the strap 10 of FIGS. 1–3. The alternative pouch 34 includes one or more, preferably two, rings 36 are attached to the pouch 34 by short connecting cords 38, which may be elastic. Alternative means for joining the rings 36 to the pouch 34 are also acceptable provided that the rings 36 are located away from the mouth 18 of the pouch 34 so as to not interfere with storage of the cover body 22 inside the pouch 34 or removal of said body therefrom. FIGS. 4 and 5 depict a suitable locale for the rings 36 and the cords 38 which will not obscure the mouth portion of the pouch 34. FIG. 4 also illustrates a recommended curved mouth edge, designated by reference numeral 40. This curved edge 40 increases the perimeter of the mouth 18 when said pouch 34 is open, thereby facilitating passage of the cover body 22 therethrough. Although FIG. 4 illustrates the rings 36 supporting the pouch 34 at the side of the wearer's head, it may be more desirable to situate the pouch 34 behind the wearer's head by hanging said rings from a strap 10 that encircles the back of the head as in FIG. 1. This will hide the pouch 34 from view and may present a more stylish appearance.

As with FIGS. 1–3, FIGS. 4–6 also present the three steps of using the cover body 22. In step 1 (FIG. 4), the cover body 22 is stored within the pouch 34. FIG. 5 depicts step 2 wherein the mouth 18 of the pouch 34 is opened to allow the cover body 22 to be manually withdrawn from storage. This step will involve unfastening whichever closure means are utilized to shut the mouth 18. Such closure means are provided by a hook and loop type fastener 42 in the embodiment illustrated in FIG. 5. Finally, the cover body 22 is unfolded from its compact storage profile and is stretched to fit about the lens portion of a pair of eyeglasses 14, as shown in FIG. 6.

From the foregoing, it will be appreciated that the improved protective eyeglass cover of the present invention is advantageously machine washable, relatively inexpensive, and easy and convenient to use. Moreover, with use of the present invention, it is less likely that an eyeglass wearer will be without protection for the eyeglass lenses because the spectacle cover is stored for handy use within a pouch that is associated with either the eyeglass frame or a strap for retaining said frame about the wearer's neck. Further, it is extremely difficult to lose the spectacle cover because it is tethered to the pouch. The present invention provides ideal protection for sunglasses in a beach environment because the strap is capable of providing storage for the spectacle cover in the absence of pockets which are typically omitted in swimwear such as bikinis.

While several particular forms of the invention have been illustrated and described, it will also be apparent that various modifications can be made without departing from the spirit and scope of the invention. Accordingly, it is not intended that the invention be limited, excepted by the appended claims.

We claim:

1. An improved cover for protecting eyeglasses having lenses and foldable arms adapted for retention behind one's ears, said cover comprising:
   a flexible strap having first and second ends, each of said ends providing means for releasably attaching said strap to an arm of eyeglasses,
   a hollow flexible body adapted to receive and cover the lenses of eyeglasses and shaped in conformity therewith and provided with edges that define an opening sufficiently large to pass the eyeglasses therethrough and including means for securing said edges about the lenses;
   wherein said strap includes pouch means for accommodating said flexible body therein, said pouch means being integrally formed within said strap, wherein said flexible body is foldable to a compact profile suitable for accommodation within said pouch means, and further including;
   tether means for connecting said flexible body to an interior portion of said pouch means.

2. An improved cover as set forth in claim 1, wherein said hollow flexible body is comprised of fabric.

3. An improved cover as set forth in claim 1, wherein said strap, said pouch means and said flexible body are comprised of a knitted or woven material.

4. An improved cover as set forth in claim 1, wherein said pouch means includes closure means for fastening shut portion of the strap which define a mouth to the pouch means.

5. An improved cover as set forth in claim 4, wherein said closure means comprises a zipper.

6. An improved cover as set forth in claim 4, wherein said closure means comprises hook and loop fasteners.

7. An improved cover as set forth in claim 1, wherein said means for securing the edges comprises a hem provided along said edges and an elastic band located in the hem and adapted to draw the edges of the cover tightly about the lenses of the eyeglasses.

8. An improved cover as set forth in claim 1, wherein said strap comprises a fabric body having a substantially tubular shape at least at said first and second ends such that the tubular first and second ends each fit around an arm of the eyeglasses for attachment thereto.

9. An improved cover as set forth in claim 1, wherein said tether means comprises an elastic band having a first end attached to the flexible body and having a second end attached to the interior portion of said pouch means.

10. The improved cover as set forth in claim 1, in combination with a pair of sunglasses.

11. An improved cover for protecting eyeglasses having lenses and foldable arms adapted for retention behind one's ears, said cover comprising:

a hollow flexible body adapted to receive and cover the lenses of eyeglasses and shaped in conformity therewith and provided with edges that define an opening sufficiently large to pass the eyeglasses therethrough and including means for securing said edges about the lenses;

a pouch having an interior cavity defined therein, said flexible body being foldable to a compact profile suitable for storage within said pouch, said pouch including a mouth through which said interior cavity may be accessed, wherein portions of the pouch that define said mouth include closure means for fastening shut said pouch, said pouch further including means for removable attaching the pouch to an arm of a pair of eyeglasses; and tether means for connecting said flexible body to an interior portion of said pouch.

12. An improved cover as set forth in claim 11, wherein said means for attaching the pouch to an eyeglass arm include at least on ring sized to fit snugly about said arm.

13. An improved cover as set forth in claim 11, wherein said hollow flexible body is comprised of a fabric material.

14. An improved cover as set forth in claim 11, wherein said means for securing the edges comprises a hem provided along said edges and an elastic band located in the hem and adapted to draw the edges of the cover tightly about the lenses of the eyeglasses.

15. An improved cover as set forth in claim 11, wherein said tether means comprises an elastic band having a first end attached to the flexible body and having a second end attached to the interior portion of said pouch.

16. An improved cover as set forth in claim 11, in combination with a pair of sunglasses.

* * * * *